Oct. 29, 1940.  C. SAUZEDDE  2,219,336
MEANS FOR ACTUATING AND LOCKING BRAKE ACTUATORS
Filed May 19, 1938  3 Sheets-Sheet 1
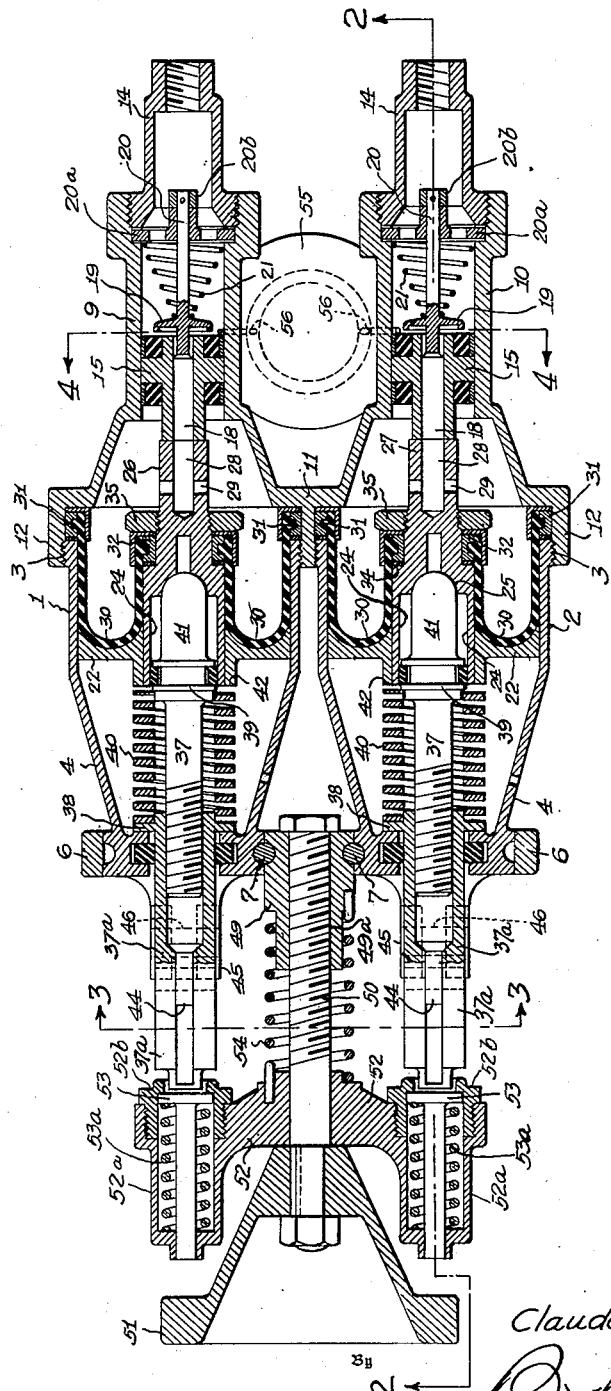
Fig. 1.
Inventor
Claude Sauzedde,
Attorneys

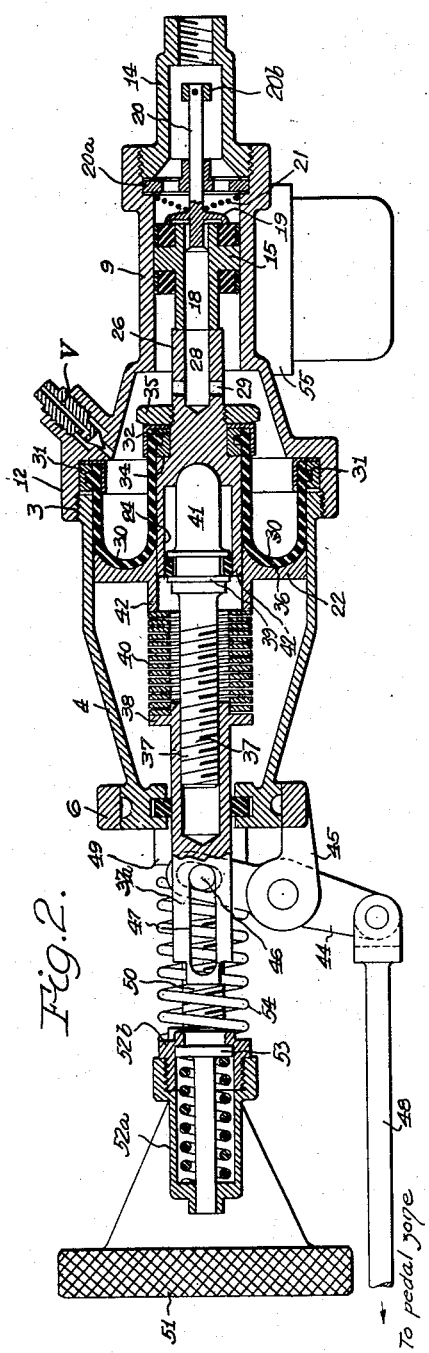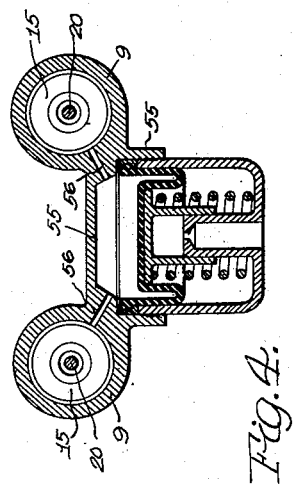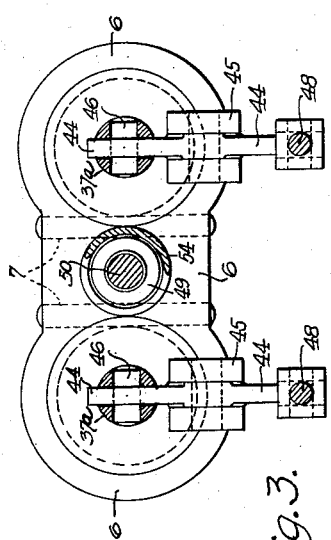

Oct. 29, 1940.	C. SAUZEDDE	2,219,336
MEANS FOR ACTUATING AND LOCKING BRAKE ACTUATORS
Filed May 19, 1938	3 Sheets-Sheet 3
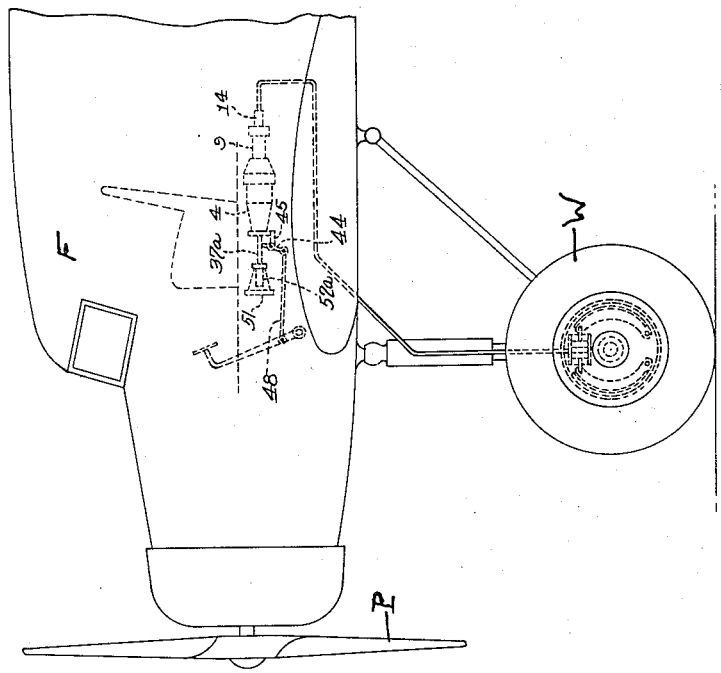
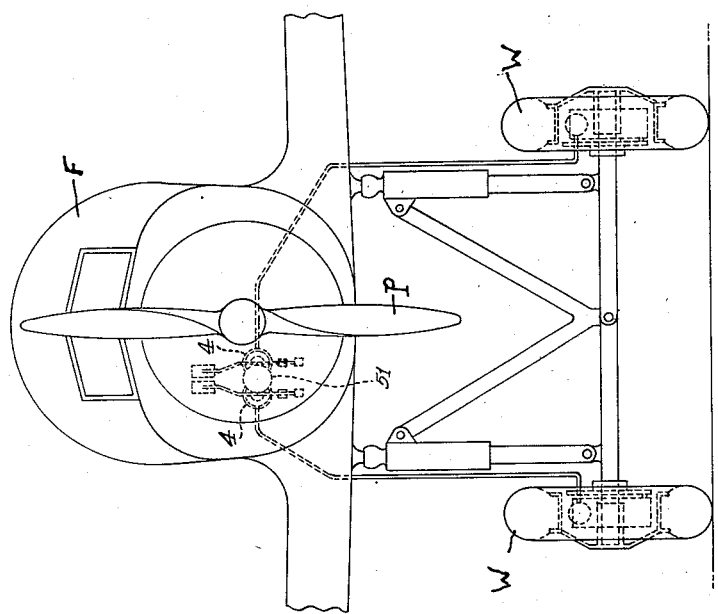
Inventor
Claude Sauzedde
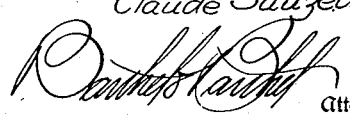
Attorneys Patented Oct. 29, 1940

2,219,336

UNITED STATES PATENT OFFICE 2,219,336

MEANS FOR ACTUATING AND LOCKING BRAKE ACTUATORS

Claude Sauzedde, Detroit, Mich., assignor to Detroit Hydrostatic Brake Corporation, Detroit, Mich., a corporation of Michigan Application May 19, 1938, Serial No. 208,758

3 Claims. (Cl. 188—265)

The present invention relates to brake mechanism service, and pertains more particularly to controllable brake manipulation particularly applicable for use in connection with airplane service, although not limited to that service.

In earlier patents and in companion applications, I have disclosed various phases and forms of a brake mechanism of a fundamental type operating under hydrostatic pressure, in which the brake structures are housed within the wheels which are to be braked; in other patents and companion applications, are disclosed various forms of actuators for applying the brakes controllably by brake pedal manipulation. Such structures are applicable for use in motor vehicle and other services, being capable of providing a relatively high brake response by pedal manipulation, so that the general system which has thus been developed, permits of service under heavy-duty conditions by pedal manipulation. The present invention is designed to amplify the service field and to carry the fundamentals of such system into service in connection with airplanes, and to expand the service to make possible the control of airplane stopping and starting by the use of the system under the extremely onerous conditions that are present in connection with the high-speed airplanes of the present day.

As will be readily understood, airplanes which travel at high rates of speed, necessarily have comparatively high landing speed—such airplanes are not only of high speed, but are generally large and of great weight, with the result that the speed required to maintain them in flight is comparatively high. Hence, attempts to land at low speed are generally dangerous, and to permit of safe landings, the planes are landed under fairly high speeds. If the landing field is of dimensions to permit a lengthy run of the plane after contact, braking mechanism of reasonable power will be sufficient to gradually bring the plane to its stop. But conditions are not always favorable to landing under such favorable conditions, and hence it becomes necessary to obtain greater brake power to permit more rapid deceleration of the plane speed after contact.

Because of the necessity of such planes to attain high speeds before they are able to lift from the ground, the limitation in the length of runways available, has led to the practice of holding the plane stationary—as by the use of chock-blocks, etc.,—until the propeller speed has reached the proper value, after which the obstructions are removed to permit the plane to advance at an initial rapid speed and thus more quickly gain the ability of the plane to rise within a reduced length of runway. Obviously, the speeds required to lift the plane are at least equal to those of the landing speeds—actually the lifting speed is generally higher than the landing speed, fuel supplies are greater at the take-off—so that, with heavy and high speed planes, the question of removing the obstructions used to restrain the initial start may, at times become a serious matter.

The present invention is designed to reach to both these conditions by the use of a braking mechanism of high power type, capable of bringing the plane to a stop under high landing-speed conditions and within a reasonable limit of distance such as would avoid disaster, with the braking application under the control of the pilot. And also to use the same mechanism as a means for providing the initial restraint at starting, with the mechanism so arranged as to place the control of the release of the restraint entirely with the pilot, and with the control such that the restraint can be removed, as rapidly as desired, thus enabling the pilot himself to completely control the starting of the plane in flight.

One other feature in connection with this particular service is brought about by the conditions of service of the plane itself. In these days of plane flight to great distances, landings must be made at many different altitudes, and within a range of a few hours. In addition, the plane is subject to conditions of rapidly changing temperatures with the range limit of such changes very high. While the brake mechanism would come into actual service under landing and take-off conditions, the fact that such extreme temperature variations are present during flight and take place rapidly, has tended to deter the use of hydraulic brake mechanism for the service, due to the fact that the fluid in general use has a temperature range generally considerably less than such as would be encountered under such service conditions. The lower limit of the range at which the fluid congeals (about $-20°$ F.) is considerably above that of the temperatures encountered by the plane in serevice. And the upper limit set by the low boiling point (about $200°$ F.) tends to set up fluid vaporization; this condition would not be affected by the climatic conditions of service, but the need of extremely heavy friction to provide effective braking action quickly heats the fluid within the braking zone, and thus makes such temperatures available to render the fluid vulnerable to vaporization. In either case, the fluid may be affected in such manner that when the time for actual service arises, the fluid may be impaired for efficient service.

To meet the condition, the present system contemplates the use of a special fluid—a fluid having a freezing point of approximately −58° F., while the boiling point is approximately 430° F., a range which is well beyond the temperatures which would be encountered in service—the plane would not be likely to encounter temperatures as low as the lower limit of the fluid range, and the temperatures developed by the braking service would not reach the upper limit of the fluid range. Hence, the fluid will remain in serviceable conditions for this particular service. The fluid, however, has the characteristic of being highly hygroscopic to an extent that if subjected to moisture, or to the hydrogen content of the air, it is capable of absorbing practically five times its volume in air with consequent deterioration and possible detriment to the braking system through variation in the effective volume. To prevent this, the system is arranged as a closed system—provision being made to prevent leakage of air to and from the system—thus retaining the volume substantially constant, while utilizing the fluid having this wide temperature range characteristic.

Other and further objects of the invention will be made apparent hereinafter.

To these and other ends, therefore, the nature of which will be readily understood as the invention is hereinafter described, said invention consists in the improved constructions and combinations of parts hereinafter fully described, illustrated in the accompanying drawings, and more particularly pointed out in the appended claims.

In the accompanying drawings, in which similar reference characters indicate corresponding parts in each of the views—

Figure 1 is a horizontal section taken through the actuator unit employed in the present invention; the remaining elements of the system are omitted, since they are substantially similar to those used in the general type of braking system of which the present invention forms a particular service embodiment;

Figs. 2, 3 and 4, are sectional views taken on lines 2—2, 3—3 and 4—4, respectively of Fig. 1.

Fig. 5 is a diagrammatic or schematic view of a portion of a conventional airplane, including landing wheels, the view being of a front elevational type.

Fig. 6 is a view of the forward portion of the plane of Fig. 5 and indicating a side elevation of the portion of the plane shown.

Before proceeding with the details of the invention, a brief statement of the conditions of service is made.

Present day airplanes, and especially those of large size, are generally equipped with a pair of landing wheels which may or may not form part of a retractible landing unit. These wheels are generally arranged as individuals, since they do not function as driving wheels. Due to the heavy weights that are generally present with present-day airplanes, the landing wheels are generally of large diameter, utilizing tire structures of large dimensions; the wheels must be capable of withstanding heavy shock conditions since they must be capable of practically absorbing the shock which takes place when the plane makes its first contact with the ground; after the contact is had, the wheels must then be capable of sustaining the weight of the plane. To meet these conditions the wheels are of large dimensions and carry large dimensional tire structures. Because of the latter, a considerable portion of the wheel diameter is taken up by the tire structure, so that the brake mechanism used must be located within a somewhat limited central zone of the wheel.

While the latter zone is of considerable dimensions, thus enabling the braking mechanism to be carried within the wheel—within the hub zone—the conditions of service pointed out above make it necessary that the braking mechanism have a very high braking value, due to the fact that landing must be at a comparatively high speed with the weight momentum of large value; since, at the instant of contact, the wheels must run free, the braking power must be applied after contact, and be sufficient to stop the plane within a relatively short distance, especially since available landing runways do not generally have the space which would permit the plane to advance until brakes of reasonable power can bring the plane to its stop. Since high braking power is necessary, and the power source is generally limited to foot pedal operation, it is essential that the power translation must be high, speedy, and efficient.

And somewhat similar conditions are present during take-off of the plane if the brake mechanism is to be utilized as a substitute for the removable chocks generally used. Since the propeller speed must become high before it is possible to start the rise of the plane, it is evident that if the plane run is to be retained within reasonable limits, the brake mechanism must be capable of withstanding the large pull of the speeding propeller or propellers, until the latter have reached a speed such that the pilot deems it feasible to release the plane from a held position. When the latter moment arrives, the braking mechanism must be capable of rapid release so that it will not form a drag such as would tend to prevent the plane itself from quickly gathering the desired speed to begin to rise.

Due to these conditions, the present invention provides practically an individual braking operation for each wheel, each wheel having its individual actuator, with the two actuators operatively connected to a pedal structure common to the two actuators and operatively connected with the latter through motion-translating devices such as to develop a high power component. In connection with this arrangement, the assemblage is arranged so that when the brakes have been set by such pedal operation, a locking device can be rapidly moved to position to set the actuators in their brake-set position, thus enabling the operator to release his foot from the pedal and retain the brake-set conditions. When, during the take-off, the pilot approaches the point of time when the brakes are to be released, he again actuates his foot pedal to transfer the brake load from the locking device to the pedal, releases the locking device, and at the proper moment then releases the pedal, thus rapidly releasing the brakes with resultant freedom of wheels for the advance of the plane. Hence, stopping and starting of the plane movements is completely and wholly under the control of the pilot himself.

Taking up first the various elements employed, the braking mechanism within the wheels will be first discussed. The specific structure of this is not disclosed herein, since it may be of any of a number of forms found in various patents heretofore granted to me and all of which are of a generally common type, or of other forms found in companion applications. The type itself is shown for instance, in Patent No. 2,008,728, July 23, 1935, in which the non-rotatable portion of the mechanism is carried by a spider, with the latter suitably supported by or relatively to an axle. The spider carries two or more radial cylinders in which are located individual pistons each of which carries a segmental portion of the brake shoe structure, the latter being in the form of a pair of brake-shoe segments spaced apart, with the brake shoe faces inclined both to the vertical and the horizontal with the inclination opposite in the two segments; the casing for the mechanism—and which may be the wheel drum—is formed with braking surfaces complemental to the brake shoes. The brake-shoe units are connected to springs which oppose the movement of the brake unit piston and serve to return the brakes to inactive position when the pedal is released.

The inner ends of the cylinders are arranged to receive the fluid of the system, the inner ends of the pistons being provided with a suitable seal which prevents escape of fluid or entrance of air. The several cylinders are connected by suitable passages in the spider, the passages having a connection with the fluid pressure line from an actuator. When the pedal is depressed the fluid in the line is driven into the spider passages and into the respective cylinders with the result that the pistons are moved radially outward, thus carrying the brake shoes into contact with the braking surfaces. The amount of fluid required to produce such movement of the pistons is comparatively small, even when the shoes have become worn and thus have increased the "slack" distance that is inherently present with all brake structures—to ensure that brakes will not be accidentally set—so that it is possible to quickly set the brakes, as well as release them. The fact that a maximum of braking surface contact can be quickly set up, and with the contact provided by radial movements of the pistons makes it possible to rapidly develop the high frictional resistance that is necessary to bring a heavy plane, moving at high speed, to a stop within a short distance.

The above sketchy description of the braking mechanism is illustrative of the type of mechanism to be used. The structural details of the mechanism and of its mounting, may be varied widely as indicated by the disclosures of other patents and of companion applications. These reach to structures usable under various conditions, some with full-floating axles, "three-quarter floating axles," etc. And the detail structure of the spider, cylinder and piston have been widely varied in these structures, so that it is possible to utilize any of a large number of forms of braking mechanism structures for the braking zone of the system, all of which, however, have the general characteristics of the type outlined above. Because of these conditions, the braking zone structure has been omitted from the drawings, it being understood that the fluid line leads from the actuator structure by suitable connections to the spider or its equivalent. In my companion application, filed April 17, 1937, Serial No. 137,580, and which will be discussed below, the drawings indicate diagrammatically a braking zone such as is referred to.

For the purpose of indicating somewhat of the application of the present invention to an airplane, Figs. 5 and 6 present diagrammatic or schematic views of the parts of a conventional plane to which the invention is shown as applied. In these views the fuselage of the plane is indicated at F—the cockpit zone being indicated in Fig. 6—with the usual propeller P forward of the engine zone. A conventional landing gear is shown, this carrying a pair of landing wheels W, these being equipped with internal brakes. As described in detail hereinafter, the actuator mechanism is arranged to be individual to each of the wheels W, the individual connections being indicated in Fig. 5. This figure also shows the presence of a pair of braking pedals B, these being individual to the two actuators, an arrangement which permits ready taxi movements of the plane after landing. No attempt is made in these views to accurately define the actual dimensions, or the specific arrangement of the various elements as they would be presented in actual service, the views being designed to illustrate diagrammatically the manner in which the plane operator is able to control the landing and take-off activities of the plane by foot manipulation, thus leaving the hands of the operator free for the required operation of the plane controls necessary in the landing or take-off activities, such controls being omitted from the drawings, since they play no part in the operation of the present invention, other than the control of the operation of the plane itself during these activities.

As above pointed out, the actuator structure of the present invention is designed to operate the brakes of the pair of wheels, as individuals—an actuator for each of the two braking zones; the actuators are substantial duplicates, and hence the detail description thereof will be provided by describing one of these structures.

I and 2 designate generally similar casings of the two actuators, each comprised of a rear cylindrical portion having a reduced rear end 4, the cylindrical portion forming the wall of a chamber for a large piston 22, the rear portion forming a housing for structures presently referred to. The forward part 12 of the casing is threaded to the rear portion, as at 3, this portion carrying a cylindrical portion 9 of smaller diameter which forms the wall of a small diameter chamber which is in permanently open communication with the connections leading to the braking zone, a fitting 14 being adapted to provide the connection; portion 9, in rear of the cylindrical portion is expanded outwardly to provide the connection with the rear portion 4, and serving as a wall for a large fluid chamber in advance of piston 22. The forward portions 9 of the two structures are united together, as at 11.

Within the smaller chamber 9 is a piston 15 adapted to be reciprocated within the chamber in rear of the outlet to the connections. The piston is shown as of the type disclosed in my companion application, Serial No. 139,074, filed April 26, 1937; this is illustrative, since other forms of packing may be employed, the particular form shown being an advantageous structure for the particular service which the present system is to perform. The piston has a tubular stem with the opening 18 extending from end to end and of such dimensions as to freely receive the centering end of a valve stem 20 which carries a valve 19 adapted to cooperate with the forward face of the piston to act as a closure for the opening at certain portions of the operation of the system. The stem 20 extends through a spider 20a, which serves as the forward end wall of this chamber, with the wall itself perforated to provide open communication between the interior of this chamber and the connections to the braking zone. The stem carries a collar 20b which serves to limit the rearward movement of the valve through contact with the spider. A spring 21 serves as a means for moving the valve in the direction of its seat at the forward end of the piston. The collar 20b is so positioned that the valve may move rearwardly with the piston 15 to a point near the rest or inactive position of the piston, whereupon the collar prevents further movement of the valve in this direction, so that further travel of the piston rearwardly to its rest position carries the seat from the held valve and opens communication between the chamber and the opening 18 of the piston.

The rear end of the piston stem abuts the forward end of a member 26, axially alined with the piston 15 and which extends rearwardly into the portion 4 of the casing. Member 26 has an axial recess 28 alined with the opening 18, the member carrying lateral ports 29 which serve as permanently-open communication ports between the recess 28 and the large chamber in rear of piston 15. Hence, when valve 19 is open, a communication is established between this chamber and the smaller chamber in advance of the piston, which communication is controlled entirely by valve 19, the position of the latter relative to its seat determining whether or not fluid may pass between the two chambers.

The member 26 extends rearwardly with its rear zone enlarged diametrically to form a cylindrical bearing surface on which the large piston 22 has its movements, this zone having a central recess open at the rear to receive the forward end 41 of a rod connection 37 which forms a part of the connections to the brake pedal (not shown); the forward end of the portion 41 is rounded to seat in a complemental recess of the member 26. The connection 37, 41 is provided with a pair of collars—the rear collar being indicated at 39—between which is a packing element adapted to cooperate with the inner wall 24 of the rear zone of the member 26 to aid in preserving alinement of parts, etc. The rear portion of connection 37 is threaded to adjustably receive a threaded member 37a, presently referred to in detail, this member extending into the interior of casing 4 and provided with a collar 38 therein; since member 37a is threaded to connection 37, it will be apparent that the collars 38 and 39 provide opposing walls which travel in unison—with the distance between them variable through adjustment—and which provide a space of definite length external of connection 37; this space is designed to receive a spring 40 active as a power spring during operation.

As will be seen, the outer diameter of collar 39 is greater than the inner diameter of spring 40, while the outer diameter of spring 40 is greater than the similar diameter of the rear end of member 26; consequently, both collar 39 and the rear end 42 of the large piston 22 may be concurrently engaged by the spring. From this it can be seen that although spring 40 cannot expand a greater distance than the distance between collars 38 and 39, the spring may be compressed by the advance of collar 38 under conditions where piston 22 does not advance, or advance at the same rate; in such case, collar 39 will advance with collar 38, but with the piston 22 stationary or advancing at a lesser rate, the rear end 42 of the piston will prevent advance of the forward end of the spring, or retard its advance, as the case may be, thus placing the spring under an increasing compression which is then effective entirely upon piston 22 since collar 39 has advanced relative to such rear end 42.

In addition, assuming the advance to have taken place and the parts are in the advanced position, as when the brakes are set, piston 22 will be under the pressure of spring 40, with collar 39 materially advanced beyond the end 42 of piston 22; at the same time, collar 38 will be under the pressure of spring 40. Hence, if member 37 be released by release of the pedal pressure, members 26 and 37 can move rearwardly independent of piston 22, thus moving collar 39 in the direction of contact with the forward end of spring 40; when such contact is had, further rearward movement of member 37 will carry spring 40 with it bodily, since the limit of expansion of the spring is reached when such contact is had. As presently explained, piston 22 does not, in service, move rearwardly with member 37 at such time with the result that at the instant of contact of collar 39 with the spring during such rearward travel, spring 40 becomes inactive as a power source for piston 22. Hence, spring 40 may itself be under constant compression and yet have its power value made active and inactive in connection with piston 22, a condition which enables the power value of spring 40 to be readily obtained by retaining the spring normally under compression, and instantly apply the power of that compression to the piston when the pressure is needed.

The piston 22 is slidable on member 26 and has its forward face concave in cross-section to permit of the reception of an elongated sac-like resilient element 30 formed of suitable material such as rubber, this element having its free edges cemented or otherwise secured to annular metallic members 31, 32 which are adapted to be held in clamped positions, member 31 being clamped between casing members, while member 32 is clamped against an offset of member 26 by a nut 35, so that this member (32) moves with member 26. The element 30 serves to prevent leakage of fluid or entrance of air past the piston 22, so that the content of the large chamber is retained free from contact with the air.

The arrangement thus far described, excepting as to certain details which will be presently referred to, conforms generally to the structure disclosed in my companion application filed April 17, 1937, Serial No. 137,580, and, in operation, is generally similar to that of the operation of the structure of the companion application, the latter being designed more particularly for general application, as, for instance, in motor vehicle service, the disclosure of the latter application including detailed illustrations of the structure, including the braking zone, under service conditions. Because of this relationship, the claims bearing on this portion of the invention are presented in the companion application. Because of this condition, the present disclosure omits certain features of the companion disclosure, and it is necessary only to give a general statement of the details of the operation of the system as thus far disclosed, and this is now presented:

With the brake pedal at rest or inactive, both pistons 22 and 15 are in their rear positions (Fig. 1) with the chamber in advance of piston 22, the chamber in advance of piston 15, the communicating passageway between the chambers, the connections to and in the braking zone filled with the operating fluid; in addition, fluid is present in an automatic compensating unit 55 (Fig. 1) which is open to the smaller chamber through port 56 when the pistons are in this position—this unit will be presently described in detail, being an application of a unit of similar type presented in the companion application referred to, and which, also is sealed against the entrance of air or leakage of fluid. Hence, with complete communication throughout at this time, the system contains a definite volume of fluid (initially introduced through a valve structure V, designed to permit discharge of air during filling, which is then closed permanently) which fluid is sealed within the structure in such manner that fluid leakage or air entrance is prevented, the fluid content remaining constant as to volume; temperature changes may affect the active volume, but this is automatically taken care of by the automatic compensating device, so that the fluid volume remains constant in amount.

At this time the brakes are in their released positions, so that the braking surfaces which are to cooperate when setting the brakes are then spaced apart the usual distances in addition to whatever wear may have taken place, this spacing being generally known as the "slack," and which, during the braking cycle, must first be taken up in order to bring the surfaces into contact. As is obvious, the slack is minimum when the brakes are first installed, increasing with wear until the surfaces are practically "worm out," after which new linings are applied, restoring the slack to practically its initial position. In taking up the slack the resistance is practically limited to that provided by the brake springs, so that power requirements are small, but inasmuch as the amount of slack is variable, it is desirable that it be taken up quickly, and for this reason the operation is so designed that the required volume of fluid is rapidly introduced into the connections to the braking zone under the action of both pistons. When, however, brake surface contact is reached, the resistance becomes high in order to apply the setting pressure, and for this reason it is essential that the power value be correspondingly increased, this being accomplished by rendering the large piston inactive, and utilizing only the small piston 15 during the brake-setting period.

Therefore, assuming the parts to be in the position of Fig. 1, brake pedal depression serves to advance connection 37, 37a, thus advancing member 26 and the small piston 15—since there is no direct connection between the pedal and the large piston 22 (excepting through spring 40) the large piston is not initially advanced. As piston 15 begins its advance, it quickly closes port 56 (thus segregating the content of the compensating device 55 from the active fluid) and reaches contact with valve 19. When the valve thus seats it closes communication between the two chambers. But such advance has also advanced collar 39, thus placing the power of spring 40 directly upon the large piston; spring 40 has an overpowering value with respect to spring 21 and the brake springs, and hence closed valve 19 becomes subject to the power of spring 40 as the latter becomes active as a power source for piston 22, through the pressure of piston 22 on the fluid in the larger chamber, the result being that valve 19 is advanced from its seat, restoring communication between the chambers. Consequently, during the period when valve 19 remains open, the small chamber is receiving fluid from the larger chamber to rapidly increase the volume in the connections leading to the braking zone, and thereby shift the brake members through the distance of the "slack," regardless of the length of that distance.

When the braking surfaces contact, the resistance is increased to major value, with the result that its value greatly exceeds the power of spring 40. The effect is immediate within the connections and in the smaller chamber, since the braking mechanism can then advance the shoes only by yielding of contacting surfaces, brake linings, for instance. As a result, the resistance is made effective within the small chamber, the resistance value of which becomes greater than the pressure value within the opening or channel 18, thus placing valve 19 under the power of its spring 21 and instantly closing this valve to thereby prevent return of fluid to the large chamber. Since, the volume of fluid in the large chamber has no open outlet—valve 19 being closed—and receives no return fluid, piston 22 become stationary, due to the fact that spring 40 is unable to then open valve 19.

This action has served to divide the fluid into two increments in addition to the portion previously segregated in the compensating unit 55 at the beginning of the piston advance; one portion of the fluid remains in the large chamber, while the other portion is found within the small chamber, the connections and in the brake mechanism; the former remains inactive during the remainder of the advance operation, while the latter becomes the active fluid used in setting the brakes, this being done by the advance of the small piston 15 alone through pedal actuation, which, due to the relative dimensions and the compounding of power, is able to provide the power necessary to provide the additional movement needed to obtain the desired brake-pounds pressure condition.

When it is desired to release the brakes, pedal release leaves the small piston without power opposing the high resistance set up in the braking zone, with the result that the power value therein, the power built-up by the resistance, in addition to the power of the brake springs, together with the power of spring 40 which is temporarily made effective on collar 38 (piston 22 being stationary) causes the small piston to move rapidly to its inactive position, valve 19 remaining closed, spring 21 being active during this period. During this return movement of piston 15, collar 39 will again reach alinement with the rear of the hub of piston 22, whereupon spring 40 becomes inactive as a power source, and is carried bodily rearward with the piston 15 and its operating structure, thus leaving piston 22 free from any power. Hence, any displacement of fluid within the large chamber required to permit piston 15 to return is provided initially by the large power value within the small chamber which exceeds the power value of spring 40 so that piston 22 can yield during this period; when spring 40 becomes inactive, piston 22 will pass rearward freely. When, therefore, the return movement of piston 15 has caused valve 19 to reach the end of its rearward stroke, the further movement of piston 15 opens communication between the two chambers, so that continued pressure of the brake-springs to carry the brake shoes to their rest position, will cause fluid to flow into the large chamber to an amount equal to that which had been discharged therefrom in taking up the slack, piston 22 being free to move rearwardly to secure this result; as piston 22 is then under no resistance, while the spring of the compensating unit 55 is effective at such time, it will be understood that although port 56 is opened by piston 15 in reaching its rest position, piston 22 will also return to its rest position, before the actual compensation, if required, takes place.

As will be understood, with the parts at rest, the several chambers are in open communication, the large and small chambers and the compensation unit; hence, the system carries a potential supply of fluid to meet all of the conditions of braking service, and since the system is a sealed system, the volume present remains constant although there may be expansion or contraction under temperature conditions, the latter being taken care of through the automatic compensation unit. Hence, at the beginning of the braking cycle, the volumes in the large and small chambers will be the same with each cycle, made manifest by cutting off the compensating unit and leaving the remainder within the two chambers and connections. During the period of taking up the slack this entire supply is utilized as a source, the large chamber supplying the fluid for the slack, the small piston serving as a displacing agency. When braking surface contact is had, the supply in the large chamber is segregated by the closing of valve 19, so that the setting operation is by the displacing action of the small piston 15 alone. Hence, the active volume during the setting period is the normal volume in advance of piston 15 and the additional volume supplied from the large chamber. During the return stroke, this combined volume is active on piston 15 alone, until valve 19 begins to unseat, whereupon the excess above the normal returns to the large chamber, with the compensating unit then making any required regulation of the fluid volume, it being understood that in the rest positions, the fluid pressure of the system is that which is fixed by the spring of the compensating unit.

Because of these conditions, it can be understood that the slack conditions present no difficulty. Whether or not wear be present in the braking zone, the variations in slack value will be taken care of by the action of the large piston 22 which, being independent of pedal control will rapidly supply the amount which is required to take up the slack, it being apparent that the larger displacement by piston 22 will ensure that collar 39 will remain in advance of the rear end of the hub of this piston while pedal pressure is being applied, so that spring 40 will be active as a power source. Consequently, the pedal pressure required for setting the brakes after taking up the slack will be substantially uniform with each braking cycle.

The above, excepting as to some of the detailed structures, is present in and forms the basis of my companion application filed April 17, 1937, Serial No. 137,580, in which the general invention just described is illustrated and claimed. Amongst the detailed changes therefrom are a change in the form of the sealing element for the larger piston 22, a change in the form of the small piston 15, a change in the mounting of valve 19 to permit discharge of fluid through the end of the small chamber instead of at the side, and the division of the element 37, 37a into two parts having a threaded relationship. In addition, the compensating unit 55 has been arranged to be common to both of the actuator units.

The second actuator unit is a substantial duplicate of that just described, the two units being arranged side by side with the casings connected in the forward zone by the web 11, and at the rear by a frame 6 into which the rear ends of casing members 4 extend in spaced apart relation (Fig. 3), the frame also carrying a rearwardly-extending element 49 intermediate the two members 4, the members 4 and element 49 being held against movement by pins 7 (see Figs. 1 and 3).

As indicated above, the two actuator units are designed for service with the plane wheels as individuals—a unit serving one of the two wheels employed in the landing gear of the plane. Both units are connected up operatively for pedal actuation, either one or two pedals being utilized for the purpose as may be found desirable; if separate pedals are utilized each unit is subject only to the actuation of its own pedal, a condition which may be advantageous under some conditions—to permit dirigible movement of the plane when on the ground by varying the braking pressures as between the wheels. In any event, the invention contemplates the presence of individual connections between the pedal source and the respective units, whether the power source be a single pedal arranged for multiple power application, or a pair of pedals connected up individually. The pedal arrangement is not shown in detail being more or less standard and obvious, the drawings illustrating the unit ends of individual rod connections 48, it being understood that these connections extend to the pedal zone with the latter arranged to provide such compounding of power as may be desirable through the use of levers, etc., in a well known manner.

Each element member 37a extends rearward of frame 6 and has its end zone formed with a slot 47 designed to receive a pin 46 carried by a lever 44 pivotally supported on an arm 45, the free end of the lever being operatively connected with the connection 48 and therefore to the pedal source. The slot permits of a lost motion relation between the pedal and element 37 thus enabling pedal release movement without affecting the individual movement of element 37 during the return movement of the latter, the release of the pedal shifting the pin to the opposite end of the slot, thus enabling the movements of the pistons during the return portion of the cycle in the manner described above. As shown in Fig. 3, the rear end zone of members 37a are also slotted at right angles to the slot 47 to receive the lever 44, the latter being slotted to enable the pin 46 to have lineal movement in presence of the arcuate movement of the lever. When lever 44 is rocked clockwise from the position of Fig. 1 to that of Fig. 2, the brake-applying activities described above will ensue; when the pedal is released, the pedal spring power operates to shift lever 44 counterclockwise, thus shifting pin 46 in the direction of the opposite end of slot 47, permitting the developments of the return portion of the cycle in the manner described.

However, as previously pointed out, the invention contemplates the ability to retain the brakes in set position without requiring the operator to retain the pedal structure depressed, as when the plane has landed and is to be held from movement—the detailed description thus far would require continued pedal depression to produce such a result. The mechanism employed for permitting such brake-set condition will now be described.

The rearwardly-extending element 49 previously referred to is formed with a longitudinal opening 49a which is threaded, as indicated, and since the element is locked in position against movement by pins 7—both longitudinally and rotatively—the element has the characteristics of an anchored nut, with the nut having a length such as to form a support for the mechanism now to be described in addition to its function as a nut. The threaded opening of element 49 receives a threaded rod member 50 having a length sufficient to extend through the nut and rearwardly thereof for a material distance, the rear end being shown as of reduced diameter, the latter carrying the hub of an operating element 51 which may be more or less wheel-like; in the disclosure, the operating element is shown as keyed or splined to the threaded rod. Hence, rotation of the element 51 will thread the rod 50 within the nut 49.

Mounted on rod 50 forward of the hub element 51 is a head 52, loose on rod 50, a spring 54 connecting the head with nut 49, the spring serving to generally hold the head against rotation and provide pressure to retain the head in a rear position and in contact with element 51. As will be understood, rotation of element 51 in one direction will advance head 52 through the threading action, while rotation of the element in the opposite direction will cause the head to follow after through the action of spring 54.

Head 52 carries a pair of cup-shaped ends 52a which are adapted to receive spring-supported plungers 53, the ends 52a having retaining elements 52b for the plungers, the elements 52b having openings for exposing the face of the plunger to the reduced rear end of element 37a.

During normal braking activities of the assembly, the head 52 remains in its rear position as shown in Fig. 1, the operator providing control through the pedal structure. If he desires to lock the plane with the brakes set, the pedal operation advances the brakes to obtain the desired braking pressure—thus advancing the rear ends of elements 37a; and while the brakes are thus set, the element 51 is rapidly rotated to bring the spring supported plunger 53 into direct contact with the rear ends of the elements 37a, this action compresses the plunger springs 53a, thereby clearing the head 53 from the retaining head element 52b, whereby the pressure of the plunger springs 53a are transferred to the elements 37a thus locking the high pressure unit against return.

The pedal structure can now be released without affecting the locked condition of the brake.

The springs 53a provide a yielding connection between the head 52 and the elements 37a, said springs having sufficient pressure to maintain the required braking action regardless of temperature changes. Further the springs 53a readily compensate for any expansion or contraction of the braking fluid within the system. The pressure exerted by the springs 53a are at all times sufficient to maintain the required braking pressure in the system within the limits of the expansion and contraction of the braking fluid. When it is desired to release the brakes, the operator applies pressure on the pedal structure sufficient to restore pedal activity with the units and to take pressure off of head 52, whereupon element 51 is rapidly rotated in the opposite direction to return the head to its normal inactive position, to thereby place the brakes entirely under pedal control.

With reference to the "quick release" activities of the locking mechanism that are referred to above, it is desired to make the following explanation:

As is apparent, the brake mechanism resistance required to place the mechanism as a substitute for the usual "chock block" activities, must be very high, since, with the modern high-speed and large weight planes, it is necessary to raise the propeller speed to a considerable value preliminary to start of the actual take-off; the plane must clear the run-way—be free of contact therewith—before the end of the run-way is reached, and as the length of the run-ways is generally limited, the propeller speed must have been developed to a considerable value in advance of applying the "gun" action by the pilot at the instant the plane begins its advance. Obviously, at such speeds of the propeller, the "pull" exerted by the propeller action is of considerable value. The only resistance to such "pull" is provided by the brakes, in the present invention, and hence the brake-pounds pressure in the braking zone must be extremely high, in order that slippage may be prevented. Since such pressure can be maintained only through the resistance set up in the brake-applying mechanism, it is apparent that there is a heavy pressure condition in the direction of release of the actuating mechanism. This latter pressure must be prevented from being active to change the set condition of the locking mechanism during the period in which the propeller is being brought to the desired speed.

In presence of this heavy pressure condition in the direction of release, it is apparent that the locking mechanism must sustain this pressure without danger of release developing, and to provide this, the connection is provided in the form of a threaded connection, as shown, for instance by members 49 and 50. In such connection the thread pitch can be such that the high pressure present is ineffective to cause even "creeping" of the movable member through the pressure applied to the threads of the connection; if "creeping" be possible, the mechanism would gradually release the brakes and thus permit advance of the plane before the pilot is ready for the advance. Hence, the locking mechanism must itself provide for an absolute locked condition prior to the start of the actual take-off.

On the other hand, when the pilot is ready to begin the actual take-off, the brake mechanism must be absolutely freed instantly, since the plane itself must pass from its position of inertia to its lifting speed before the end of the run-way is reached, so that acceleration of the plane advance must be extremely rapid, a condition which would be vitally affected if the brake release was at a slow rate, such as would occur if the attempt be made to release the brakes by moving member 50 in the reverse direction, with the connection provided by threads capable of resisting the high pressure during the preparatory period of the propeller speed development. Incidentally, it is also apparent, that such arrangement of locking mechanism could not be employed for applying the brakes since the time required to advance the head the linear distance sufficient to produce the brake application would be prohibitively great.

In other words, if member 50, for instance, were relied upon to actually apply or release the brakes, especially in this particular service, the linear advance or release of the header would not only be slow because of the large number of turns required of member 50, but would be amplified by the fact that the pressures of the braking zone are being made effective on the threads to largely increase the friction and thereby tending to retard the efforts to provide rapid rotation of member 50. Obviously, these conditions would appear to be the reverse of what could be considered as a "quick release." It is apparent, however, that if the brakes can be applied by a different mechanism capable of withstanding the high pressures produced or present in the braking zone, the pressures become inactive on the threads of the connection to provide the turning resistance, and the member 50, for instance, could then be quickly advanced or returned, since it is then a question of the free movements in the threaded connection so that the member could quickly "run" in either direction.

In the present invention the latter action is present, due to the fact that the separate brake applying and release mechanism is present and set up by the pedal actuating mechanism, itself capable of providing the needed brake-pounds pressure in the braking zone. This latter mechanism is made active preliminary to any attempt to move member 50 in either direction. With the pedal mechanism active, such mechanism takes up the pressures, leaving the member and the threaded connections free to be quickly "run" to the proper position, after which the pedal mechanism can be made inactive by the connections providing the resistance (where the brakes are being applied) or the pedal mechanism becomes active in controlling the release of the brakes. Under these conditions the pedal mechanism is itself the sole means for applying or releasing the brakes—the locking means serves simply as a convenient means for permitting the pilot to obtain his desired result without being required to maintain his feet constantly on the brake pedals and retain the brakes set by his continued foot pressure. The locking means is completely inefficient as a brake applying or releasing agency; it is of maximum efficiency in relieving the pilot from the necessity of manually retaining the brakes set.

Not only is this advantage present, but the combination of the pedal mechanism and the locking mechanism, of the form requiring the operation of both whenever the locking mechanism is to be employed, presents another definite advantage. Obviously, a pilot must be free to operate the various controls needed in starting his plane into flight or in landing it. Modern planes utilize many of such controls so that both hands are needed to meet the conditions. While it is true that member 50, for instance, must be manipulated by the use of the hand, the conditions are such that he provides this hand operation only when the plane is at rest, at a time when the other controls require no attention. When these other controls require attention, the braking control is wholly by the feet of the operator, leaving both hands free for such other control operation. And, due to the inefficiency of the locking mechanism in applying or releasing the brakes, the operator discards all thoughts of using the locking mechanism at any time while the plane is in operation.

It would be possible, of course, to set the locking mechanism at an intermediate position, with the brakes lightly set, for instance, but in airplane service no advantage would result, since a plane requires no braking action in flight, or during actual take-off; and during landing, the inefficiency of the locking mechanism in brake-applying is such as to make its use as the brake-applying agency detrimental instead of advantageous. As presently described, however, the ability to provide such intermediate position with light brake-setting, would be advantages with heavy-duty land vehicles, for instance, since, in travelling down grade the set locking mechanism could be utilized to provide light braking and relieve the pilot to this extent, without preventing further brake application by pedal activity when required; in such case, the locking mechanism provides an artificial limit to the range of activity of the pedal mechanism as affecting the brakes.

This latter action can take place without affecting the operation of the actuator zone, since the light braking pressure is sufficient to provide closing of valve 19 with piston 15 in a proper position, and with piston 22 and its spring 40 inactive to change the volume of fluid in the connections. Piston 15 could be advanced by the pedal action without changing these conditions and thus increase the brake pressure when desired. When the exigency is ended, the locking means is returned to its inactive position as before. In such use the locking mechanism would be serving as a brake-pressure maintaining agency as before, but at an intermediate point in the stroke of piston 15, and would serve the same purpose as before—to relieve the operator from a continuous manual application of pressure on the pedal mechanism.

The inability to utilize the locking mechanism for applying or releasing the brakes is indicated further by the conditions present when the plane is being landed and when it begins the take-off operation. During landing, the brakes must be applied in a manner to secure stoppage within a short distance, but the application must be gradual to prevent the plane from turning over; it is possible to provide this action through the fact that as the speed is reduced by the checking action of the brakes, the tendency to turn over is correspondingly reduced, so that the application of the brakes can be developed with considerable rapidity and thus bring the plane to its stop within a short distance without danger of overturning. With a locking mechanism arranged to prevent "creeping" during take off, the rate of advance of the locking mechanism, in presence of resistance in the thread zone, would be too slow to permit this result being obtained. The present invention meets the condition by utilizing the pedal manipulation to produce the stoppage of the plane, and when this is obtained—and while the brakes remain set by the pedal—rapidly advancing the locking mechanism to provide the desired contact with the actuator elements, after which the pedal is released, the locking mechanism then retaining the brakes set. In this way the brake application is accurately controlled by the pilot and the plane safely landed.

In take-off activities the conditions differ. Instead of a decrease in speed condition, as in landing, there is an increase in speed condition, not of the plane but of the propeller, with the speed development active to provide a definite "pull" value on the plane, a value that increases as the propeller speed increases. With the run-way limited as to length, the plane speed must develop at a very rapid rate if the plane is to rise from the run-way before the end of the latter is reached; hence, the "pull" value must be high before the plane begins its advance, this can be rapidly increased by the pilot by throttle action after the plane has started its advance and thus permit the plane to reach its lifting speed within the limits of the run-way. Under these conditions, the plane must be held from advance, and the brake mechanism must retain the plane stationary until the preliminary warm-up propeller speed is attained. As a result, the brake mechanism must be capable of withstanding this "pull" value until the pilot is ready to provide the throttle acceleration.

While the brake mechanism could be retained in such position by pedal manipulation, the fact that the brake mechanism must be held at the maximum brake-pounds pressure from the beginning of the warm-up period, would inevitably be a severe hardship for the pilot—the reason for using the "chock-block" method. With the present invention, this condition is met by the locking mechanism which retains the desired brake-pounds pressure which had been provided by the pedal manipulation and the pedal then released. When the pilot is ready to begin the plane advance, he first manipulates the pedal to again bring it into its position with respect to the actuators, and slightly increases the pressure to permit the locking mechanism to be freed from the brake-zone pressures, and then rapidly runs the locking mechanism to its inactive position, leaving the brakes set but with the brakes under pedal control. This is needed in order that the brake pressure can be rapidly released (practically instantaneously) to permit maximum results from the throttle acceleration; with pedal manipulation, sufficient release of brake pressure can be had to enable the inertia to be overcome, whereupon the pedal can be completely released concurrently with the opening of the throttle for acceleration; the slow rate of travel of the locking mechanism in the releasing direction—if the locking mechanism were the sole control—would prevent this action. With the locking mechanism manipulation thus limited to periods when the plane is at rest, the hand manipulation of the locking mechanism presents no disadvantage; with the locking mechanism in inactive position the hands are free to manipulate the operating controls needed to meet the conditions of the actual take-off.

While the contrasting conditions between landing and take-off may appear to be due to difference in speeds during the two periods, the difference is less than might appear. This is due to the difference between the fuel and oil values in the two periods; when landing, these values have been decreased through use during flight, but in the take-off period the maximum values for the flight being started must be present in the plane, thus adding to the weight, a condition which affects the lift of the plane. Hence, with the heavily-laden plane the need for the greater lift power requires that the "pull" value be greater at the time the brakes are released to begin the take-off to thereby increase the acceleration of the plane advance. Consequently, at the take-off the brake pressure must be maximum and practically instantly released, while, during landing, the brakes are applied gradually as the speed reduces, comparatively high speed conditions being present during both operations, plane speed during landing, and propeller speed during the take-off.

From this it is apparent that the braking control is entirely under the control of the operator, regardless of whether the time of brake application, brake release, or brake sustenance is considered; not only is pedal operation required to set the brakes, but it is active when the element 51 is to be made active, and must be present when element 51 is to be released—this for the reason that it is desirable to set and release element 51 quickly, and for this purpose the element and head should be free of pressure excepting possibly the pressure of spring 54. Hence, the brakes are under the desired set condition when the holding structure is to be made active, and this condition is retained when the element is to be released. In other words, the brake-set retaining means acts as a temporary relief means for the operator pedal operation, with the retaining means assuring that the brake pressure will remain constant while the means is active.

As will be understood, the arrangement will operate sufficiently, whether the power is applied by a single pedal or by dual pedals. The head 52 is acting as a unit on both actuators, but this does not materially affect the operation even in case the slack values of the brake units may vary with respect to each other. This is due to the fact that the difference in volume of fluid that may be required to take up the slack in the two units is supplied from the large chamber by the action of the piston 22 of the unit, and the power for piston 22 is provided by spring 40 and thus is relatively independent of the pedal pressure on the piston 15 and its operating unit—piston 22 will supply the required excess of fluid during substantially the same length of movement of the pedal (thus permitting the use of a single pedal structure) if the volume varies as between the units.

As will be understood, the assembly is operated by pedal control in bringing the plane to rest, the retaining unit being inactive during such period; after coming to a stop at the desired point, the retaining unit may be made active to retain the plane in such position. If it is desired to shift the position of the plane, the operator again manipulates the pedal structure to resume pedal control of the assembly, and releases the retaining unit. However, the greater value of the retaining unit comes from the fact that it permits use of the assembly during plane starting. The motors of planes are generally given a period of "warming" before an attempt is made to get the plane into the air; there may be a preliminary warming operation, prior to starting in addition to that preceding the take-off. During these periods it is necessary to prevent the plane from advancing, and the common practice is to place chocks in advance of the wheels; during the take off, these chocks must be removed—generally after the motors have gained proper speeds, a condition that is practically compulsory where the runway has a limited length.

It is in this particular service that the assemblage is of great value. With the ability to provide heavy braking pressures by pedal operation, and to then retain these pressures by the activity of the retaining unit, it is possible to provide this preliminary warm up action that had required the use of chocks, etc., and doing this without requiring the operator to attempt to hold the plane by pedal operation during the period. After the operator takes his position for the take-off, and provides his take-off warm-up, he resumes pedal control by releasing the retaining unit, and is therefore able to release the brakes practically at the instant he increases the fuel supply for the travel over the runway, so that it is possible for him to accurately gauge the brake release to the most favorable conditions as to speed, etc.; this is of definite advantage, since it enables the operator to include the "feel" characteristic within his starting activities, all of which are under the complete and sole control of the operator himself.

It is obvious that to obtain this result, a number of conditions must be present. The braking assembly must be capable of producing the required braking pressure by pedal manipulation, since it is necessary to permit release of the brakes at the instant when the hands are engaged in controlling the supply of fuel as well as steering. The brake release must be rapid in operation, since the advantage of coordination must be leakage-proof; if leakage were possible, the braking pressure would drop and the operator be faced with the unexpected advance of his plane at an undesired time. These are a few of the conditions which must be met to enable a braking mechanism to be utilized for this service.

These conditions are met by the assembly found in the present invention. Due to the fact that the pedal operation is itself dealing only with the brake-setting conditions—the slack conditions are met by the relatively independent low-pressure piston operation—it is possible to obtain the power compounding which will enable the pedal operation to produce the desired brake pressure conditions. The assembly itself is arranged to provide for the rapid release of braking pressure, since such release comes through release of the high pressure piston which is being subjected to the action of the entire volume of fluid active during brake-setting, including the volume supplied from the low pressure chamber, ensuring rapid shifting of the high-pressure piston when the pedal structure is released. Leakage is prevented through the fact that the system is itself completely closed, being sealed at all points where leakage might occur; with the compensation unit active at the close of each brake cycle to ensure that the volume of fluid is uniform in each cycle, assurance is had that the proper brake pressure will be maintained when it has been initially obtained; in addition, the fact that the slack volume of fluid is supplied from the low pressure chamber and with rapidity by the low pressure piston, retains these favorable conditions regardless of wear in the braking zone.

The sealing means for the fluid is located at the ends of the fluid channel formation for each unit and in the compensating unit; the seal in the braking zone is not shown, but, as in companion applications and patents, it is provided in each of the piston chambers of a braking unit; the means for the compensation unit is shown in Fig. 4. In each instance, the body of the means is elastic with the marginal portions cemented or otherwise secured to metallic ring structures, the latter being employed to permit securing of the elastic body at its proper point, as by a clamping operation, without subjecting the body material to the clamping pressure, such pressure being taken by the metallic rings. With the fluid spaces and channels filled with fluid, the walls of the elastic body will be properly held in contact with the parts with which they cooperate—the pistons, for example—and yet permit of the ready changes required by the operation of such pistons, etc. The sealing means thus isolates the fluid channels, etc., from leakage of fluid from the system, or the entrance of air into the system, thus making the system one that is completely closed.

While piston 15 is itself within this closed fluid space, and thus protected by the sealing means referred to, this piston itself should be arranged to prevent leakage of fluid between the two chambers around the piston; since the large piston is supported only by spring 40, leakage of fluid around piston 15 during brake setting, would prevent full power being applied to the brakes, in addition to which the brake pressure would fall during the period when the retaining means was active and relied upon to preserve the brake-set condition. Hence, in the present disclosure, the packing for piston 15 is preferably of the type disclosed in my companion application, Serial No. 139,074, above identified, and which utilizes an outer piston ring structure supported by an elastic body portion with the latter having a face exposed in the direction of the pressure application; under the higher pressure values the elastic body is deformed in a manner to expand the piston ring to thereby set up the non-leakage condition between the piston and the wall of the chamber.

While the disclosure of the invention indicates a structure especially adapted for use in connection with airplane service as above pointed out, the structure is not limited to such service, since it is apparent that the structure shown is adapted for service in other respects. For instance, its value is apparent in the field of motor vehicle service, especially under heavy duty conditions, such as vans, busses, etc. The heavy braking requirements would justify the use of a dual actuator unit assembly such as described, and the presence of the retaining mechanism would not only permit meeting the conditions of parking, etc., but could well serve as a substitute for the separate hand brake structures. One advantage present is the fact that it would be possible to locate member 51 in an intermediate advanced position, as when travelling down a long incline, thus ensuring the presence of a minimum braking action and yet permitting increase at will through the pedal, thus relieving the driver of the need for continuous pedal operation during the extensive need for braking application. With the retaining mechanism capable of rapid change, the driver would be able to change from fully set to fully released condition at will with rapidity.

As indicated above, the structure disclosed includes structures found in companion applications previously filed; because of this the claims to the features which are common to such companion applications are not presented herein but are found in such companion applications.

As is apparent, the structure disclosed is adapted for service with planes utilizing dual control features, since it is necessary only to render either pedal active with a common element itself active to transmit the pedal pressure to the means employed for actuating members 48.

While I have herein disclosed the underlying features of the present invention, and pointed out one or more ways in which the same may be carried into effect, it will be understood that changes and modifications in the specific structures disclosed may be found desirable or essential in meeting the exigencies of service or the desires of users, and I therefore desire to be understood as reserving the right to make any and all such changes or modifications therein as may be found desirable or essential insofar as the same may fall within the spirit and scope of the invention as presented in the accompanying claims when broadly construed.

Having thus described this invention, what is claimed as new is:

1. In the control of landing and take-off activities of airplanes, wherein the plane includes a pair of landing wheels, and wherein the take-off is dependent upon a predetermined propeller speed, a braking instrumentality for each landing wheel of the hydrostatic type of brake mechanism and having its braking zone carried by the wheel and its fluid actuating zone remote therefrom with the zones operatively connected to provide a mobile fluid-piston relationship therebetween, means operative to render the instrumentalities concurrently brake-active from an operating source under the control of the operator and by operator activity, the actuating zones of the instrumentalities occupying a common station and having a common support and operatively connected with the operating source, mechanism operative at will upon the brake-applied instrumentalities for maintaining the brake-applied positions of the instrumentalities, whereby the brake-set condition may be maintained independently of operator control, said mechanism being cooperative concurrently with the actuating zone structures, said mechanism having screw-thread characteristics and being manually movable to inactive position with rapidity when operator control of the braking instrumentalities is resumed to thereby permit operator control of time of brake-release, whereby propeller activity and braking activity are under common operator control to permit brake release when the propeller speed for take-off is satisfactory to the operator, and said mechanism including cushioning means for absorbing shock incident to rapid return of the actuating zone structures to inactive position upon release of the brakes.

2. In the control of landing and take-off activities of airplanes, wherein the plane includes a pair of landing wheels, and wherein the take-off is dependent upon a predetermined propeller speed, a braking instrumentality for each landing wheel of the hydrostatic type of brake mechanism and having its braking zone carried by the wheel and its fluid actuating zone remote therefrom with the zones operatively connected to provide a mobile fluid-piston relationship therebetween, means operative to render the instrumentalities concurrently brake-active from an operating source under the control of the operator and by operator activity, the actuating zones of the instrumentalities occupying a common station and having a common support and operatively connected with the operating source, mechanism operative at will upon the brake-applied instrumentalities for maintaining the brake-applied positions of the instrumentalities, whereby the brake-set condition may be maintained independently of operator control, each actuating zone including movable members actuated from the pressure source, said mechanism having screw-thread characteristics and being manually movable to inactive position with rapidity when operator control of the braking instrumentalities is resumed to permit operator control of time of brake-release, whereby propeller activity and braking activity are under common operator control to permit brake release when the propeller speed for take-off is satisfactory to the operator, the pressure-maintaining mechanism including an element carried by the common support of the respective actuating zones by a threaded connection and with the element having zones located within the travel path of such actuating zone members, and a rotator for the threaded connection operable to shift said element into and out of its maintaining position rapidly.

3. In the control of landing and take-off activities of airplanes, wherein the plane includes a pair of landing wheels, and wherein the take-off is dependent upon a predetermined propeller speed, a braking instrumentality for each landing wheel of the hydrostatic type of brake mechanism and having its braking zone carried by the wheel and its fluid actuating zone remote therefrom with the zones operatively connected to provide a mobile fluid-piston relationship therebetween, means operative to render the instrumentalities concurrently brake-active from an operating source under the control of the operator and by operator activity, the actuating zones of the instrumentalities occupying a common station and having a common support and operatively connected with the operating source, mechanism operative at will upon the brake-applied instrumentalities for maintaining the brake-applied positions of the instrumentalities, whereby the brake-set condition may be maintained independently of operator control, each actuating zone including movable members actuated from the pressure source, said mechanism having screw-thread characteristics and being manually movable in inactive position with rapidity when operator control of the braking instrumentalities is resumed to thereby permit operator control of time of brake-release, whereby propeller activity and braking activity are under common operator control to permit brake release when the propeller speed for take-off is satisfactory to the operator, the pressure-maintaining mechanism including an element carried by the common support of the respective actuating zones by a threaded connection and with the element having zones located within the travel path of such actuating zone members, and a rotator for the threaded connection operable to shift said element into and out of its maintaining position rapidly, said element carrying cushioning means for absorbing shock incident to the rapid return of the actuating zone structures to inactive position.

CLAUDE SAUZEDDE.